June 6, 1939. R. F. BENSON ET AL 2,160,821
SPEED INDICATING MEANS
Filed May 26, 1937
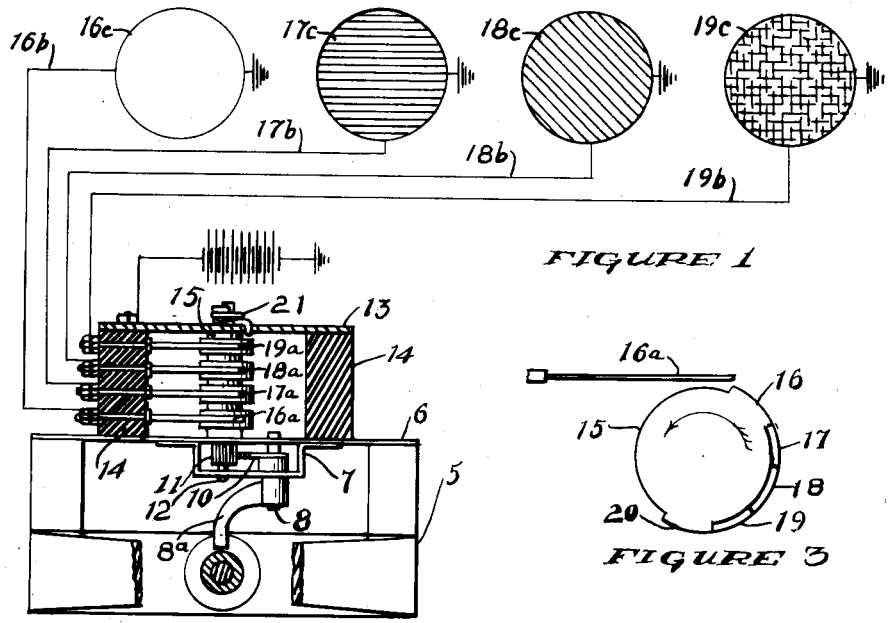
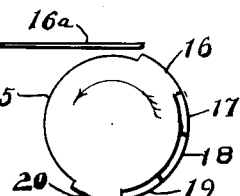
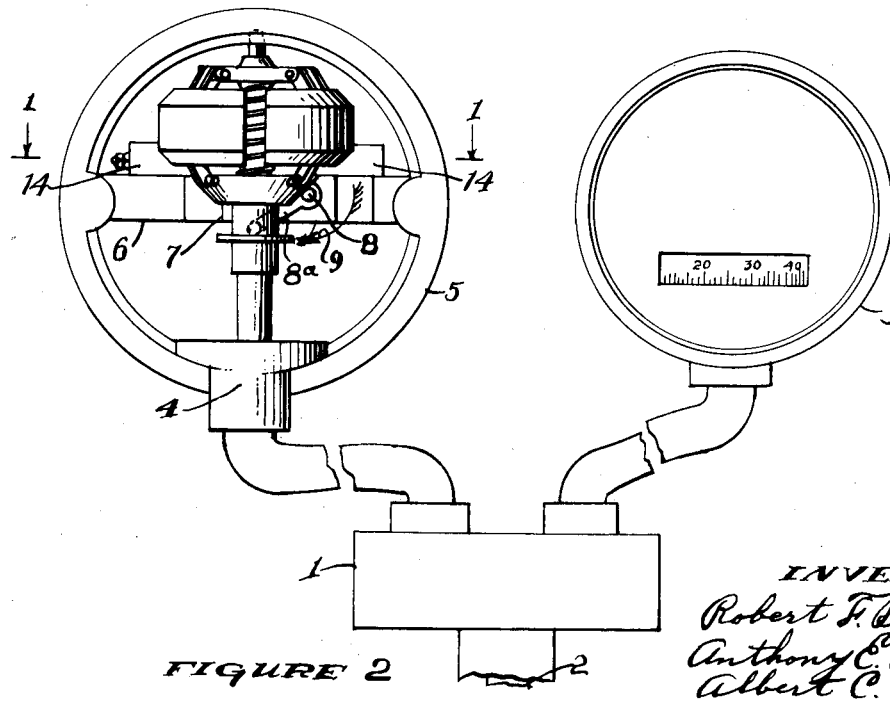

Patented June 6, 1939

2,160,821

UNITED STATES PATENT OFFICE 2,160,821

SPEED INDICATING MEANS

Robert F. Benson, Anthony E. Bauer, and Albert C. Jayet, San Jose, Calif.

Application May 26, 1937, Serial No. 144,886

1 Claim. (Cl. 200—80)

The present invention relates particularly to means for displaying visible signals that will indicate the approximate speed of a motor car.

The operation of a motor car upon the public highways has, in late years, become increasingly hazardous. While many factors are involved, the factor of speed is perhaps the most important, yet there has not been, insofar as we are aware, any means provided whereby the speed of a vehicle could be even approximately determined without actually timing the same.

Knowledge of the approximate speed at which a vehicle is moving is, of course, of great value to officers of the law and has heretofore been obtained by them with great difficulty. It would also be of great value to drivers of other cars and pedestrians, because it would give them an opportunity to correctly judge or estimate the time available for the performing of contemplated maneuvers.

It is, therefore, one object of the present invention to provide means of the character indicated that will automatically display clearly visible signals announcing to any interested observer the approximate speed of the vehicle upon which it is placed, with obvious advantages particularly to officers of the law.

It is also an object of the invention to provide means of the character indicated constructed and arranged to cooperate accurately with the speedometer of the vehicle.

It is another object of the invention to provide means of the character indicated that will be economical to manufacture, simple in form and construction, positive in operation, and highly efficient in its practical application.

In the drawing:

Figure 1 is a sectional view on line 1—1 of Figure 2 with a part broken away, and showing the lighting circuits diagrammatically.

Figure 2 is an elevation of the circuit selecting device and the speedometer with which it cooperates, parts being broken away.

Figure 3 is an enlarged fragmentary illustration of the circuit selector.

In the particular embodiment of the invention herein disclosed, we show at 1 an adapter whereby the drive 2 from the vehicle transmission may be conveyed simultaneously to the speedometer 3 and a governor 4.

On the supporting ring 5 of the governor is mounted a cross-bar 6 carrying a bracket 7, and in these parts is mounted a shaft 8 rotated in the direction 9 by the operation of the governor.

The shaft 8 has a sector gear 10 mounted thereon to mesh with a pinion 11. The pinion 11 is mounted on a shaft 12 journaled in parts 6—7 at one end and in a plate 13 at the other end.

The plate 13 is mounted on electricity insulating blocks 14 which are in turn mounted on cross-bar 6. On the shaft 12 is mounted a roller of electricity conducting material 15, this roller having four laterally spaced and radially directed peripheral bosses formed thereon as at 16, 17, 18 and 19, these bosses also being arranged in sequence circumferentially, as shown.

On one block 14 and extending therethrough, are mounted four electricity conducting terminals as shown at 16a, 17a, 18a, and 19a in such a manner that their free ends overlie the roller 15 but remain out of contact therewith when the vehicle is being operated at the lower speeds. The bosses 16, 17, 18 and 19 are so arranged, however, that when the speed of the vehicle reaches say twenty miles an hour the operation of the governor rotates the shaft 12 until the boss 16 contacts terminal 16a, thereby closing an electrical circuit indicated generally at 16b and lighting the lamp 16c.

As the speed of the vehicle increases the action of the governor continues to turn the roller 15, but the boss 16 is of such a length that the terminal continues in contact therewith until the speed of the vehicle passes the thirty-miles-per-hour mark on the speedometer. At this point the terminal leaves the boss 16 and terminal 17a engages the boss 17, thereby closing circuit 17b and lighting the blue lamp 17c.

The lamp 17c remains lighted until the speed of the vehicle reaches forty miles an hour, whereupon the terminal 17a leaves the boss 17 and terminal 18a engages boss 18, thereby closing the circuit 18b and lighting the green lamp 18c.

The lamp 18c remains lighted until the speed of the vehicle reaches fifty miles an hour whereupon the terminal 18a leaves the boss 18 and terminal 19a engages boss 19, thereby closing the circuit 19b and lighting the amber lamp 19c.

The lamp 19c remains lighted until the speed of the vehicle reaches fifty-five miles per hour, whereupon the several terminals all engage the boss 20 on the roller and all of the lamps are lighted at the same time, remaining lighted until the speed of the vehicle is again reduced, the lamps then lighting in reverse order.

A spring 21 is inserted between the shaft 12 and the cross-bar 6 and so arranged that its tension increases as the governor turns the roller 15, consequently as the action of the governor is reversed the spring 21 operates to rotate the shaft 12 and roller 15 in a reverse direction. This reverse movement is controlled by the engagement of the finger 8a on shaft 8 with the governor as shown.

The utility of the device is evident because whenever a pedestrian, an officer of the law, the driver of another vehicle, or any other interested person sees that a car is displaying a white light he knows that the machine is travelling at a speed of from twenty to thirty miles an hour, and can govern his own actions accordingly. Likewise, if a colored light is displayed, or if all of the lights are shown at the same time, he knows instantly the approximate speed of the vehicle.

Since the speedometer and the governor are operated at the same time by suitable connections to the running gear of the machine, and are so adjusted with relation to each other and to the bosses 16, 17, 18, 19 and 20 that the lamps are illuminated as described and in the mileage zones as stated and indicated on the speedometer, it necessarily follows that the driver of the car is at all times fully informed as to the lights displayed on his car. The lights would, of course, be placed both in front and in the rear of the car, and on the exterior thereof, where they would be visible from any direction. Smaller similar lights in series with the outer lights would be placed within the car to inform the driver if any outer light has burned out, and to enable him to keep informed as to the speed of the car without looking at the speedometer, the lights being visible, of course, without looking directly at them.

It is to be understood, of course, that while we have herein shown and described but one specific embodiment of the invention, changes in form, construction, and method of assembly and operation may be made within the scope of the appended claim.

We claim:

A switch for controlling a signal device for vehicles comprising, supporting means, a centrifugal governor mounted thereon, a rotatable shaft mounted thereon, governor actuated means connected to the shaft to rotate the same, laterally spaced, circumferentially offset, and radially directed bosses associated with the shaft to move therewith, terminals mounted on the supporting means and insulated therefrom, said terminals being disposed to successively contact and then leave said bosses to alternately close and open a circuit when the shaft is rotated, and a single boss associated with the shaft disposed to contact all of said terminals when the shaft is rotated to the limit of its movement in one direction.

ROBERT F. BENSON.
ANTHONY E. BAUER.
ALBERT C. JAYET.